United States Patent
Uchiyama

[19]

[11] Patent Number: 6,134,980
[45] Date of Patent: Oct. 24, 2000

[54] INTERNAL BICYCLE HUB TRANSMISSION HAVING AN OPERATING UNIT DISPOSED INBOARD OF THE FREE END OF AN AXLE

[75] Inventor: Yuzuru Uchiyama, Shimonoseki, Japan

[73] Assignee: Shimano, Inc., Osaka, Japan

[21] Appl. No.: 09/074,446

[22] Filed: May 6, 1998

[30] Foreign Application Priority Data

May 8, 1997 [JP] Japan ................................ 9-117996

[51] Int. Cl.[7] ........................... B62M 11/00; B62M 25/00
[52] U.S. Cl. .................... 74/473.14; 74/502; 192/217.4; 475/297; 475/298
[58] Field of Search .................. 74/473.14, 502.6, 74/503, 502, 473.13; 192/217.4; 475/296, 297, 298, 299, 300

[56] References Cited

U.S. PATENT DOCUMENTS

| 863,425 | 8/1907 | Newton et al. | 192/217.4 |
| 2,494,558 | 1/1950 | Irwin | 475/297 |
| 2,732,728 | 1/1956 | Douglas . | |
| 2,863,333 | 12/1958 | Golrick | 192/217.4 |
| 4,052,914 | 10/1977 | Nakajima | 475/299 |
| 4,615,423 | 10/1986 | Klauke et al. . | |
| 4,651,853 | 3/1987 | Bergles | 192/217.4 |
| 5,078,664 | 1/1992 | Nagano . | |
| 5,182,962 | 2/1993 | Leiter | 192/217.4 |
| 5,469,755 | 11/1995 | Steuer et al. . | |
| 5,562,563 | 10/1996 | Shoge | 475/298 |
| 5,769,750 | 6/1998 | Rickels | 475/298 |

FOREIGN PATENT DOCUMENTS

| 570948 A2 | 11/1993 | European Pat. Off. . | |
| 661204 A1 | 7/1995 | European Pat. Off. . | |
| 3314229 A1 | 10/1984 | Germany . | |
| 61-22076 | 7/1986 | Japan . | |
| 24847 | of 1905 | United Kingdom | 475/300 |

*Primary Examiner*—David A. Bucci
*Assistant Examiner*—William C Joyce
*Attorney, Agent, or Firm*—James A. Deland

[57] ABSTRACT

An internal hub transmission for a bicycle includes a hub axle having an axle axis for retaining the transmission to a bicycle frame, a driver rotatably supported relative to the hub axle, an output member rotatably supported relative to the hub axle, a power transmission mechanism disposed between the driver and the output member for communicating rotational force of the driver to the output member through a plurality of transmission paths, and an operation mechanism disposed in the hub axle for movement in the direction of the axle axis to select among the plurality of transmission paths. An actuating mechanism is mounted on the hub axle inboard of a free end of the hub axle for moving the operation mechanism in the direction of the axle axis.

21 Claims, 10 Drawing Sheets

INTERNAL BICYCLE HUB TRANSMISSION HAVING AN OPERATING UNIT DISPOSED INBOARD OF THE FREE END OF AN AXLE

BACKGROUND OF THE INVENTION

The present invention relates to a bicycle internal hub transmissions, and more particularly to a bicycle internal hub transmission that can be mounted to the frame of the bicycle and that transmits the power from an input member to an output member at a specific selected gear ratio.

Bicycles, particularly recreational bicycles referred to as city cruisers, are inexpensive and are easy to ride, and are thus widely used to commute to work or school or for shopping. With this type of recreational bicycle, an internal hub transmission is sometimes mounted at the rear wheel in order to ride at high speeds over flat terrain or to ride uphill with minimal exertion.

An internal hub transmission generally comprises a hub axle that is fixed to the bicycle frame, a hub shell, a driver, a planet gear mechanism, an operation mechanism and an actuating mechanism. The hub shell rotates around the hub axle and has spoke holes around its outer periphery. The driver is rotatably supported on the hub axle and is linked to the hub cog. The planet gear mechanism is disposed in the housing space of the hub shell and comprises a sun gear formed on the hub axle, a plurality of planet gears that mesh with the sun gear, a ring gear that meshes with the planet gears, and a gear frame that rotatably links the planet gears and is able to rotate around the hub axle. In the case of a three-speed bicycle, this planet gear mechanism has three power transmission paths: a direct drive position that does not go through the planet gear mechanism, an upshift path in which the ring gear is rotated via the planet gears of the planet gear mechanism, and a downshift path in which the planet gears are rotated via the ring gear of the planet gear mechanism. The operation mechanism has an operation rod disposed inside the hub axle such that it can move in the axial direction and a clutch member that moves in conjunction with the operation rod. The clutch member is used for selecting one of the plurality of power transmission paths of the planet gear mechanism.

There are two types of actuating mechanisms for moving the operation mechanism in the axial direction: a bell crank type and direct-pull type that features a chain or cable. A bell crank type actuating mechanism has a support member that is mounted at the end of the hub axle and a swing link that is swingably supported by the support member. One end of the swing link is connected to a shift cable that is linked at its distal end to a shift lever. The other end of the swing link contacts the operation rod protruding from the end of the hub axle, and a shift is performed by pushing the operation rod with the swing link. A direct-pull type actuating mechanism has a chain or cable linked to the distal end of the operation rod. With a direct-pull type actuating mechanism, the chain or cable protrudes from the hub axle end and then curves around and is linked to the shift cable, and a shift is performed by pulling the operation rod. In either case, when the shift lever is operated and the shift cable pulled or played out, the operation rod is moved and the power transmission path is switched by the clutch member.

A direct-pull type actuating mechanism has a simpler construction than a bell crank type, and therefore contributes to lower cost. However, a direct-pull type actuating mechanism involves directly pulling the operation rod with a chain or cable, so the operating efficiency is lower than with a bell crank type, wherein the operation rod is moved by the swinging of a swing link. "Operating efficiency" here refers to the ratio of the operating force actually applied by the rider to the operating force applied to the operation rod. Also, since a direct-pull type actuating mechanism involves linking the operation rod to a chain or cable inside the hub axle, the assembly work, operation rod replacement work, and so on are more difficult than with a bell crank type actuating mechanism. Accordingly, a bell crank type actuating mechanism is used more often for internal hub transmissions, and particularly for three-speed internal hub transmissions.

Regardless of which type of actuating mechanism is used, since the actuating mechanism protrudes from the hub axle end, the actuating mechanism is susceptible to damage if the bicycle falls over. Such damage to the actuating mechanism can in some cases preclude shifting. There is also the danger that the protruding actuating mechanism will hit or snag on objects while the bicycle is being ridden.

SUMMARY OF THE INVENTION

The present invention is directed to an internal hub transmission which employs a structure that prevents damage to the actuating mechanism and keeps objects from hitting or snagging on the actuating mechanism. In one embodiment of the invention, an internal hub transmission for a bicycle includes a hub axle having an axle axis for retaining the transmission to a bicycle frame, a driver rotatably supported relative to the hub axle, an output member rotatably supported relative to the hub axle, a power transmission mechanism disposed between the driver and the output member for communicating rotational force of the driver to the output member through a plurality of transmission paths, and an operation mechanism disposed in the hub axle for movement in the direction of the axle axis to select among the plurality of transmission paths. A movement mechanism is mounted on the hub axle inboard of a free end of the hub axle for moving the operation mechanism in the direction of the axle axis.

In a more specific embodiment, the hub axle includes a groove for exposing the operation mechanism, wherein the movement mechanism extends into the groove. In this embodiment, the groove may be disposed entirely inboard of the free end of the hub axle. In this way, the support member may define an opening for exposing the free end of the hub axle, and the hub axle may extend through the support member.

In an even more specific embodiment, the movement mechanism includes a support member mounted to the hub axle and a link member swingably supported to the support member at an intermediate location of the link member. The link member includes a first arm member extending from the intermediate portion for connecting to a control cable and a second arm member extending from the intermediate portion for contacting the operation mechanism.

DETAILED DESCRIPTION OF THE EMBODIMENTS

Figure 1:
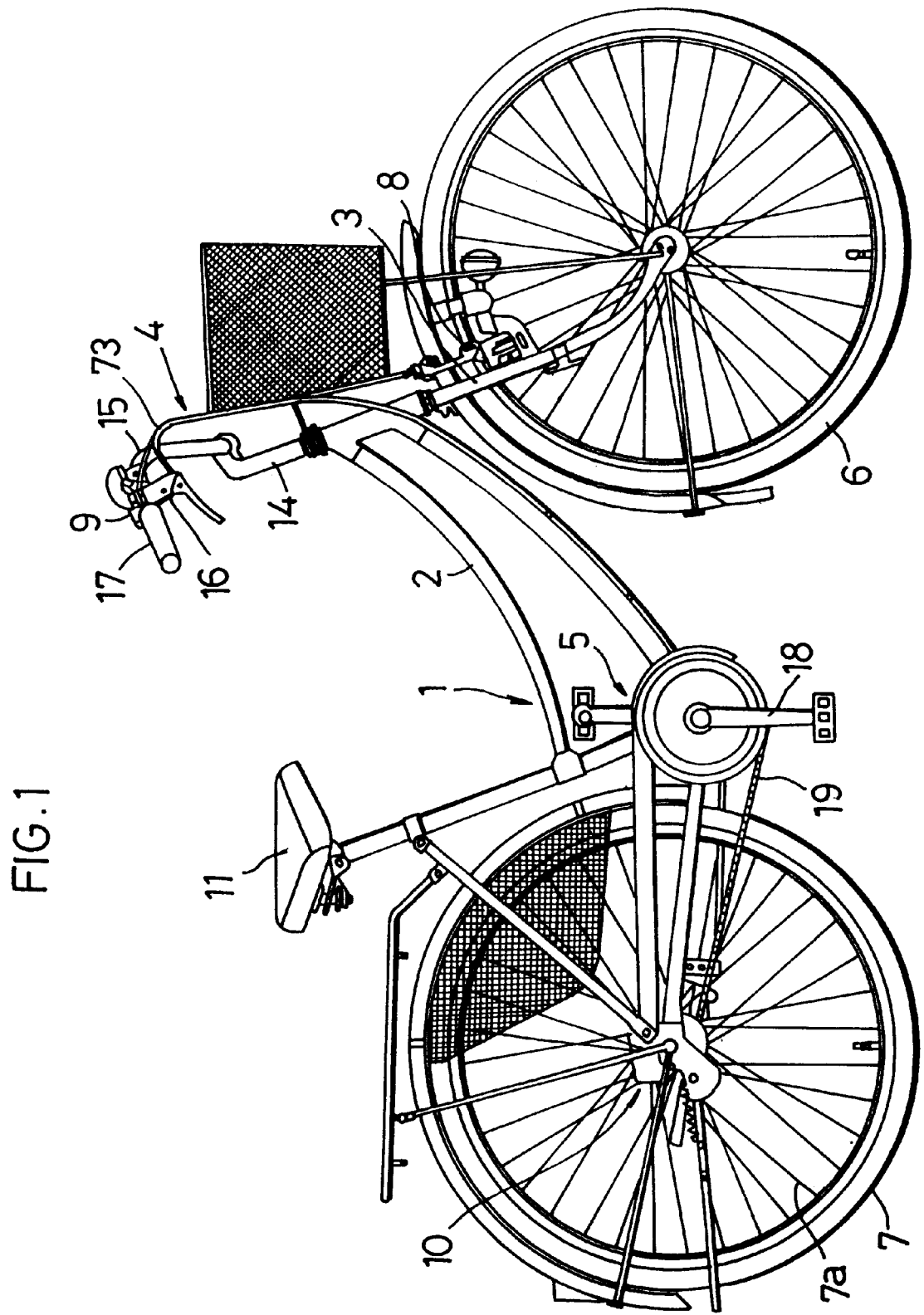
FIG. 1 is a side view of a bicycle that incorporates a particular embodiment of an internal hub transmission according to the present invention.

FIG. 1 is a side view of a bicycle that incorporates a particular embodiment of an internal hub transmission according to the present invention. This bicycle is a recreational bicycle which comprises a frame 1 having a double-loop type of frame body 2 and a front fork 3, a handle component 4, a drive component 5, a front wheel 6, a rear wheel 7 to which a three-speed internal hub transmission 10 has been mounted, a front braking apparatus 8, a gear shifter component 9 for operating the internal hub transmission 10 close at hand, and a saddle 11.

The handle component 4 has a handle stem 14 fixed to the upper portion of the front fork 3 and a handlebar 15 fixed to handle stem 14. A brake lever 16, which constitutes part of the front brake apparatus 8, a grip 17, and the gear shifter component 9 are mounted at the right end of the handlebar 15. The gear shifter component 9 is mounted on the brake lever 16 on the inside of the brake lever 16, and it is linked with internal hub transmission 10 by means of a shift control cable 73 comprising an inner cable and an outer casing formed by a spiral outer cable. The gear shifter component 9 has an ordinary structure having a winding lever for winding the inner cable and a release lever that releases the winding operation of the winding lever and plays out the inner cable, and as such it will not be described in detail herein. The drive component 5 has a gear crank 18 that is provided to the lower portion (bottom bracket portion) of the frame body 2, a chain 19 that goes around the gear crank 18, and the internal hub transmission 10.

Figure 2:
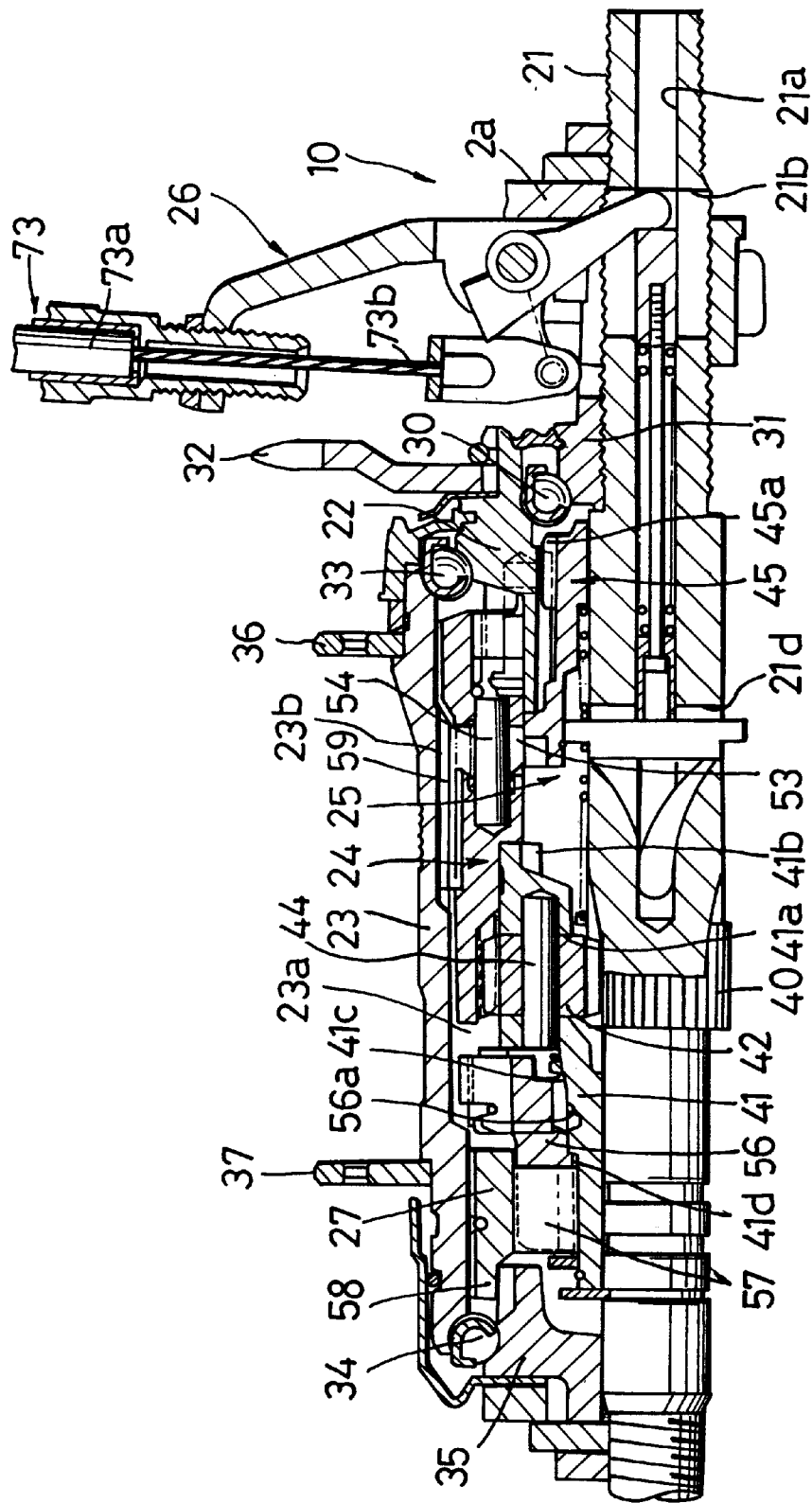
FIG. 2 is a partial cross sectional view of a particular embodiment of an internal hub transmission according to the present invention.

The internal hub transmission 10 is a coaster brake-equipped hub with a three-stage structure including power transmission paths for downshifting, direct drive, and upshifting. As shown in FIG. 2, internal hub transmission 10 has a hub axle 21 fixed to the rear dropout 2a of the frame body 2 of the bicycle, a driver 22 disposed around the outer periphery at one end of the hub axle 21, a hub shell 23 disposed further around the outer periphery of the hub axle 21 and the driver 22, a planet gear mechanism 24, an operation mechanism 25 for selecting a power transmission path, a bell crank 26 for actuating the operation mechanism 25, and a coaster brake 27.

Figure 3:
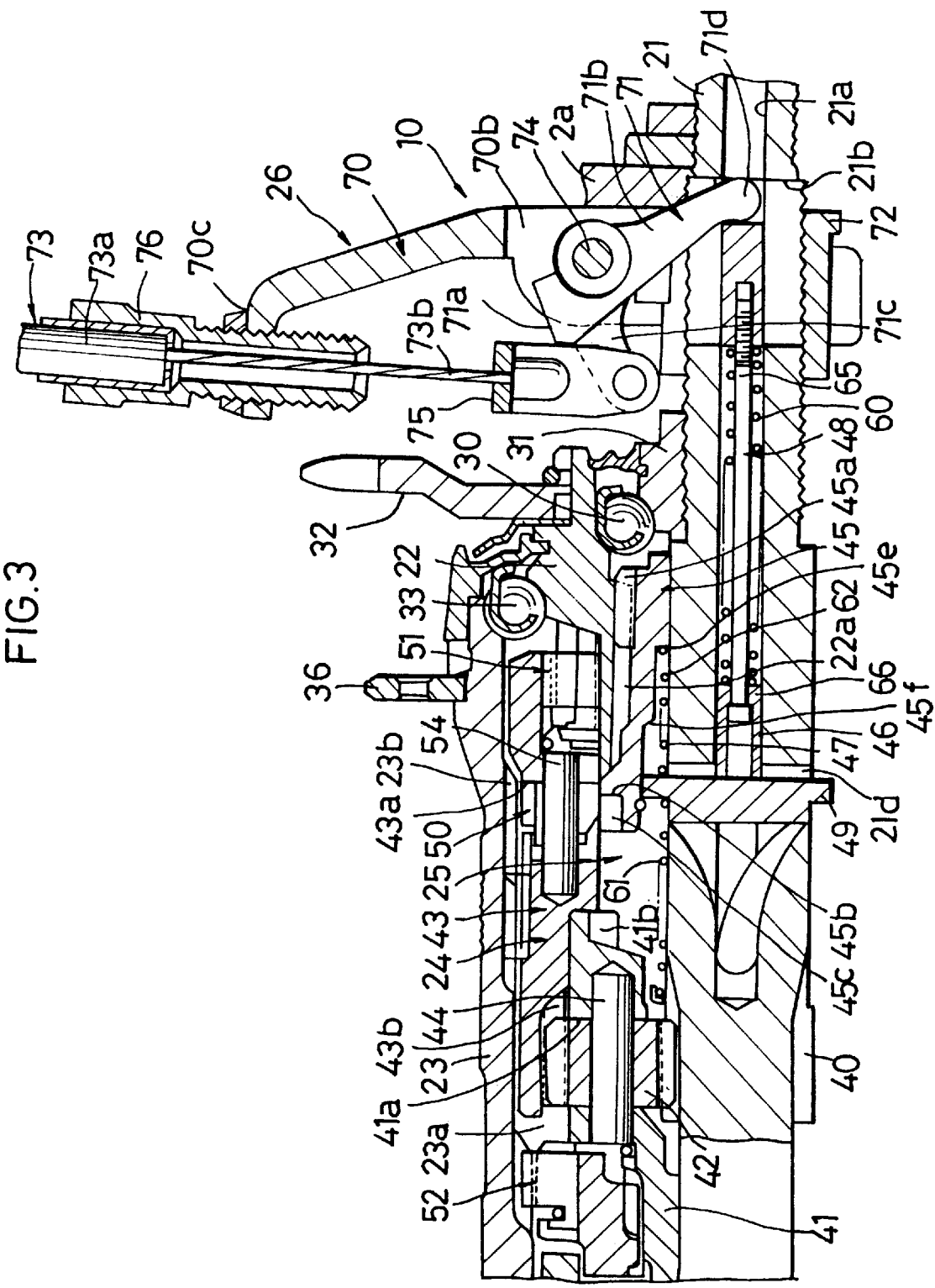
FIG. 3 is an enlarged detail view of the internal hub transmission of FIG. 2 in a low speed drive position.

As shown in FIGS. 2 and 3, the hub axle 21 is a rod-like member which has a larger diameter in its middle and a smaller diameter at both ends. Threads are formed at both ends of hub axle 21. An operation hole 21a is formed in the axial portion of the hub axle 21 from the right end to the center in FIG. 2. A first through-groove 21b extends through the axle 21 across its entire diameter, and a pair of chamfered components 21c (FIG. 7) used for mounting the bell crank 26 are formed across from each other on the outer periphery of axle 21. A second through-groove 21d is formed in the vicinity of the bottom of the operation hole 21a. The second through-groove 21d goes through the axis of the hub axle 21 and is inclined by a specific groove inclination angle $\beta$ (see FIG. 5) with respect to the axle axis. The second through-groove 21d is formed in a twist to the side opposite the forward direction going from the right to the left in FIG. 5. Second through-groove 21d is formed by using an end drill of a specific diameter to form holes that go through the axis, and then by feeding the drill toward the center in the axial direction while the hub axle 21 is slowly rotated in the forward direction. Therefore, second through-groove 21d is shaped as a continuous spiral in which the through-holes intersecting at both ends rotate gradually according to movement in the axial direction. The groove inclination angle $\beta$ should range from 10 to 50 degrees.

One end of the driver 22 is rotatably supported on the hub axle 21 via balls 30 and a hub cone 31, and a hub cog 32 is fixed around the outer periphery of driver 22 at one end. A plurality of serration inner teeth 22a are formed in the axial direction around the inner periphery at the other end of the driver 22. The hub shell 23 is a tubular member, and a housing space 23a around the inner periphery thereof houses the driver 22 and the planet gear mechanism 24. The hub shell 23 is able to rotate around the hub axle 21 via balls 33 and 34 and a hub cone 35. Flanges 36 and 37 for supporting spokes 7a (see FIG. 1) are fixed at both ends of the outer periphery of the hub shell 23.

The planet gear mechanism 24 has a sun gear 40 formed coaxially and integrally with the hub axle 21, a gear frame 41 disposed around the outer periphery of the hub axle 21, three planet gears 42 (only one planet gear is shown in the figure) that mesh with the sun gear 40, and a ring gear 43. The gear frame 41 is a tubular member, and it is rotatably supported on the hub axle 21. Three notches 41a are formed in the circumferential direction in the gear frame 41, and the planet gears 42 are rotatably supported by pins 44 in these various notches 41a.

Serration inner teeth 41b are formed around the inner periphery at one end of the gear frame 41, and serration outer teeth 41c (FIG. 1) are formed around the outer periphery at the other end.

Figure 4:
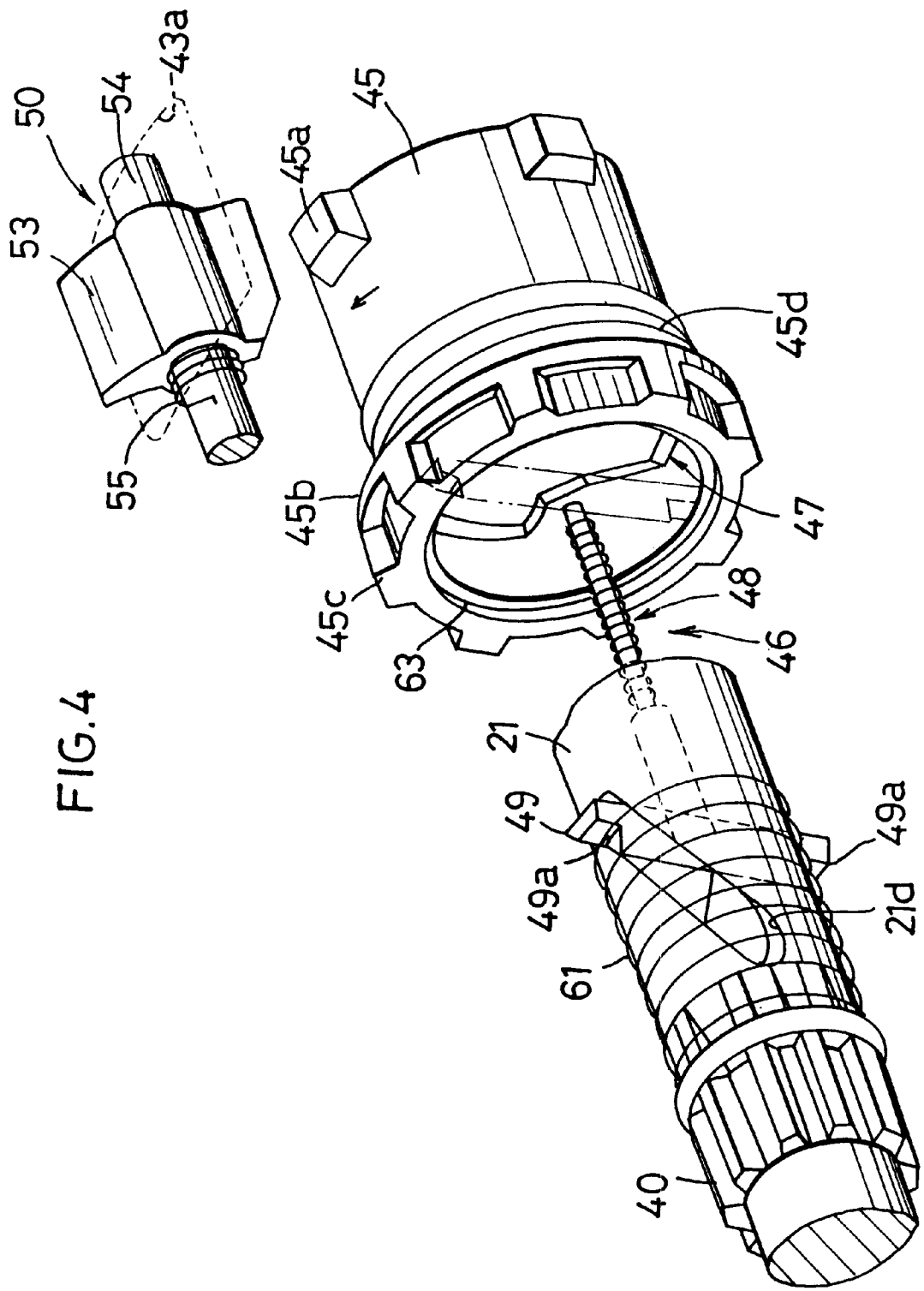
FIG. 4 is an oblique view of an operation mechanism used in the internal hub transmission shown in FIG. 2.

The ring gear 43 is formed in a nearly cylindrical shape, and it extends from the planet gears 42 to the outer periphery of the driver 22. Inner teeth 43b are formed around the inner periphery at the other end of the ring gear 43. The planet gears 42 mesh with the sun gear 40 as mentioned above, but at the same time also mesh with the inner teeth 43b of the ring gear 43. A notch 43a is formed at one end of the ring gear 43, and a clutch pawl 53 that makes up part of a first one-way clutch 50 as shown in FIG. 4 is swingably supported by a pin 54 in this notch 43a. This clutch pawl 53 is biased in the standing direction by a torsion coil spring 55 (FIG. 4). The first one-way clutch 50 transmits rotational drive force only in the forward direction from the ring gear 43 to the hub shell 23. The clutch pawl 53 meshes with the ratchet teeth 23b formed on the inner peripheral surface of the hub shell 23 only when the ring gear 43 has rotated in the forward direction. Even when in a transmission-enabled state in which the ring gear 43 rotates in the forward direction, this first one-way clutch 50 is able to switch between a power transmission state in which the clutch pawl 53 meshes with the ratchet teeth 23b and a transmission cutoff state of retraction from the ratchet teeth 23b, which is accomplished by the movement of the clutch member as discussed below.

A second one-way clutch 51 that transmits rotational drive force only in the forward direction from the driver 22 to the ring gear 43 is arranged between the driver 22 and the ring gear 43. A third one-way clutch 52 that transmits rotational drive force only in the forward direction from the gear frame 41 to the hub shell 23 is arranged between the gear frame 41 and the hub shell 23. The third one-way clutch 52 has a tubular clutch case 56 in which serration inner teeth 56a are formed around the inner periphery at one end. These serration inner teeth 56a engage with the serration outer teeth 41c of the gear frame 41, and the clutch case 56 rotates integrally with the gear frame 41. These two one-way clutches 51 and 52 are unable to perform switching in a transmission-enabled state, unlike the first one-way clutch 50.

The operation mechanism 25 is used to select the power transmission path, and it comprises a clutch member 45 and a clutch control component 46. The clutch member 45 switches the driver 22 and gear frame 41 between a linked state and a separated state, and it also switches the first one-way clutch 50 between a power transmission state and a power cutoff state. The clutch member 45 is positioned around the outer periphery of the hub axle 21 such that it can rotate and move in the axial direction.

As shown in FIG. 4, the clutch member 45 is a tubular member, and it has serration outer teeth 45a formed around the outer periphery at one end thereof. The serration outer teeth 45a are slidably engaged with the serration inner teeth 22a of driver 22. A large diameter component 45b is formed at the other end of the clutch member 45, and serration outer teeth 45c are formed around the outer periphery thereof. The serration outer teeth 45c are able to engage with the serration inner teeth 41b formed on the gear frame 41. A taper surface 45d is formed between the large diameter component 45b and one end. This taper surface 45d is provided in order to lower the clutch pawl 53 of the first one-way clutch 50 from its erected position (power transmission position) indicated by the solid line to its retracted position (power cutoff position) indicated by the two-dot chain line. When the clutch member 45 moves from the left to the downshift position on the right end, the clutch pawl 53 follows along the taper surface 45d, rides up onto the large diameter component 45b, and is lowered into a retracted attitude.

Figure 5:
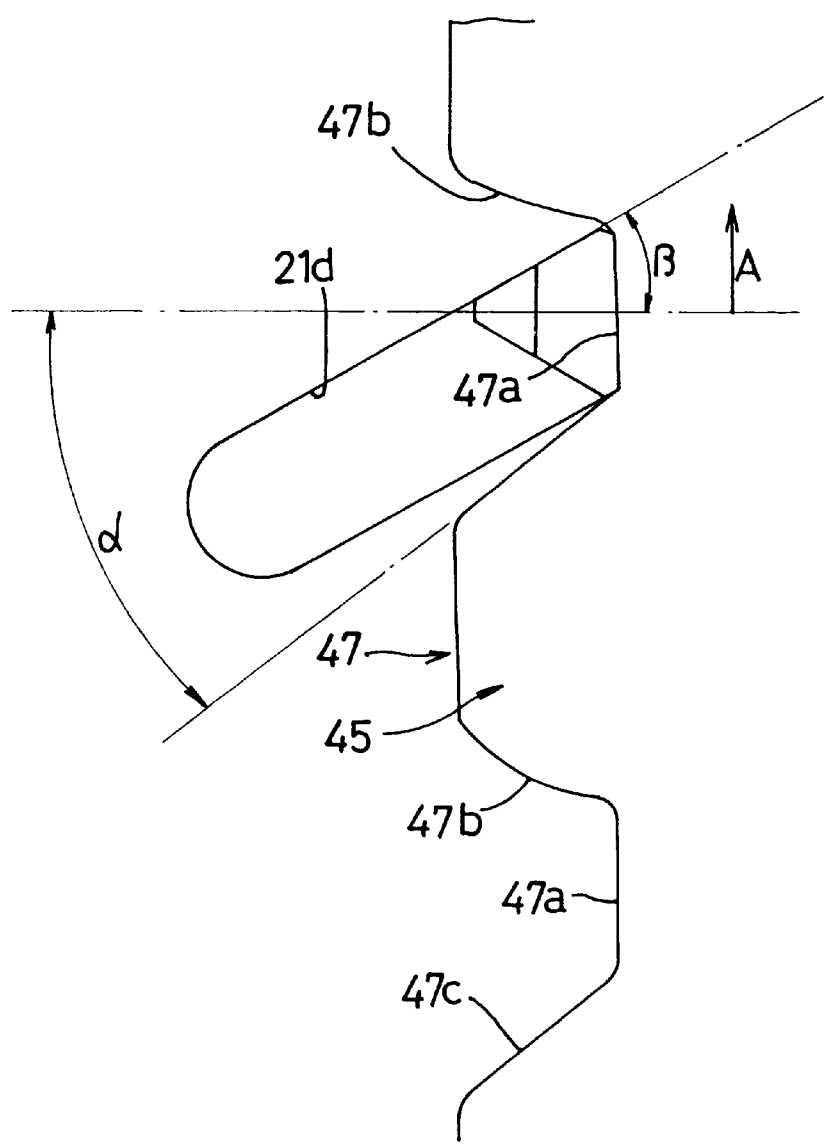
FIG. 5 is a schematic view illustrating the operation of the shift key and cam surface shown in FIG. 4.

As shown in FIG. 3, two stepped components 45e and 45f are formed around the inner periphery of the clutch member 45 with spaces between them in the axial direction. As shown in FIG. 4, a plurality of cam surfaces 47 are formed on the left step component 45f with spaces between them in the circumferential direction. As shown in FIG. 5, the cam surfaces 47 have a flat surface 47a that is depressed at one end, a curved surface 47b that leads downstream in the forward direction A of the flat surface 47a, and an inclined surface 47c that leads upstream. The inclination angle α with respect to the axle axis of this inclined surface 47c should be greater than the groove inclination angle P of the second through2 groove 21d, and between 20 and 70 degrees.

The clutch control component 46 moves the clutch member 45 in the axial direction of the hub axle 21, and it engages with the clutch member 45 to convert the rotational drive force of the clutch member 45 into displacement in the axial direction. The clutch control component 46 has a push rod 48 that moves in the axial direction through the operation hole 21a and a shift key 49 that is pressed to the gear frame 41 side by the push rod 48, as shown in FIG. 3.

Figure 6:
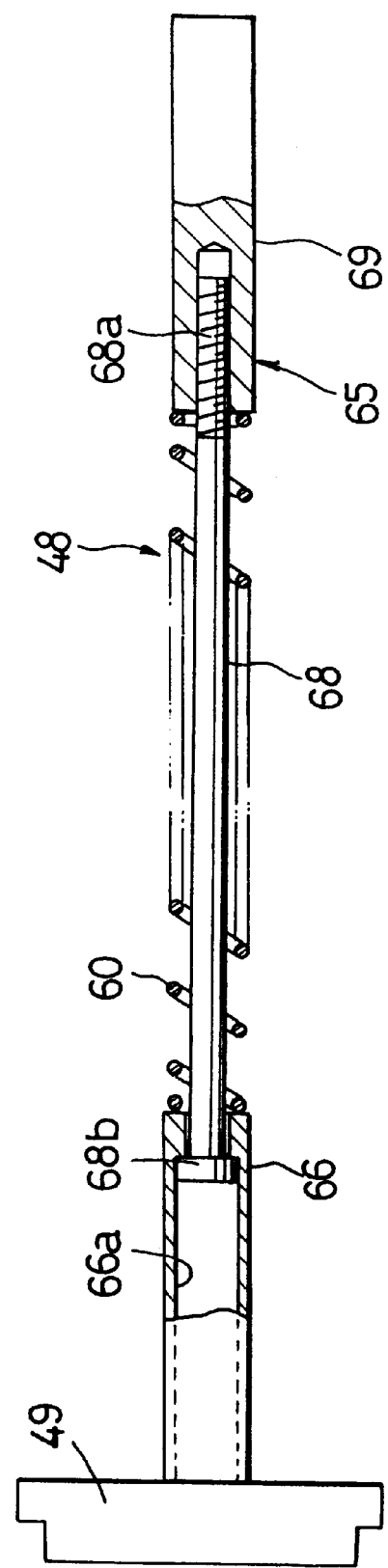
FIG. 6 is a detailed view of the push rod assembly shown in FIG. 4.

As shown in FIG. 6, the push rod 48 has an operator 65 of a specific length, an actuator 66 that is mounted on the distal end of the operator 65 such that the former can move in the axial direction, and a first coil spring 60 that is positioned between the operator 65 and the actuator 66. The operator 65 has a rod component 68 and a strike component 69 threaded onto the rod component 68. A threaded component 68a is formed on the base end of the rod component 68, and a large diameter component 68b is formed on the distal end. This threaded component 68a is threaded into the strike component 69. The large diameter component 68b is slidably mounted in a guide hole 66a formed in the interior of the actuator 66. The guide hole 66a has a smaller diameter on the actuator 66 side, which keeps the actuator 66 from coming out. The first coil spring 60 is inserted in a compressed state between the end surface of the actuator 66 and the end component of the strike component 69, and it biases the actuator 66 and the operator 65 away from each other. Thus, when the actuator 66 presses on the shift key 49, the clutch member 45 is biased toward the gear frame 41.

As shown in FIG. 4, the shift key 49 is a rod-like member with a triangular cross section. When pressed, shift key 49 moves through the second through-groove 21d while turning in the opposite direction from the forward direction, that is, while twisting. The contact surface of the shift key 49 against the second through-groove 21d is formed at an angle that follows the second through-groove 21d. For example, when the inclination angle β of the second through-groove 21d is 30 degrees, the angle of the contact surface 49b with respect to the axis is also about 30 degrees. In this embodiment, the movement of the shift key 49 is restricted to being within the clutch member 45 by a stop ring 63 mounted around the inner periphery at the other end of the clutch member 45. Therefore, the shift key 49 cannot actually come out of the clutch member 45 as shown in FIG. 4. Instead, the shift key 49 contacts stop ring 63 and moves the clutch member 45 to the left in FIG. 3.

On the other hand, the shift key 49 is able to strike the cam surfaces 47 inside the clutch member 45. If the clutch member 45 is rotated in the forward direction in a state in which the shift key 49 has struck the flat component 47a of the cam surface 47, then the shift key 49 is pressed to the guide surface of the second through-groove 21d by the inclined surface 47c of the cam surface 47. As a result, the clutch member 45 moves to the right in the axial direction. Specifically, the rotational drive force of the clutch member 45 is converted into displacement in the axial direction to assist shift control.

A notch 49a is formed at both ends of the shift key 49, and against this notch 49a is stopped a second coil spring 61 that is stopped at its other end on the hub axle 21. The shift key 49 is constantly biased toward the clutch member 45 by this second coil spring 61. A third coil spring 62 is interposed between the shift key 49 and the clutch member 45. The third coil spring 62 is restricted to a specific overall length by a restricting member (not shown). When compressed, third coil spring 62 biases the shift key 49 and the clutch member 45 away from each other before the former strikes the latter. As a result, the clutch member 45 ordinarily remains at a constant distance from the shift key 49 during movement, and is accurately positioned.

In this embodiment, the biasing forces of the first through third coil springs 60, 61, and 62 decrease in that order. If the spring force of the first coil spring 60 were less than that of the second coil spring 61, then even if the shift key 49 is pressed by the push rod 48, the first coil spring 60 would contract and the shift key 49 would not move. If the spring force of the second coil spring 61 were less than that of the third coil spring 62, then even if the shift key 49 is pressed by the second coil spring 61, the shift key 49 would not go into the cam surface 47, and shift control would not be assisted.

The first coil spring 60 is positioned in a relatively large space between the operator 65 and the actuator 66 inside the operation hole 21a, so it is possible to increase the number of coils and thereby lower the spring constant and the spring force. Accordingly, the spring constants and spring forces of the second and third coil springs 61 and 62 can be further lowered, allowing a reduction in the overall force required to press the push rod 48 during an upshift. This, in turn, would decrease the operating force of the winding lever in the shift control component 9. As a result, there is less tension on the inner cable, and the inner cable does not break as frequently.

Figure 7:
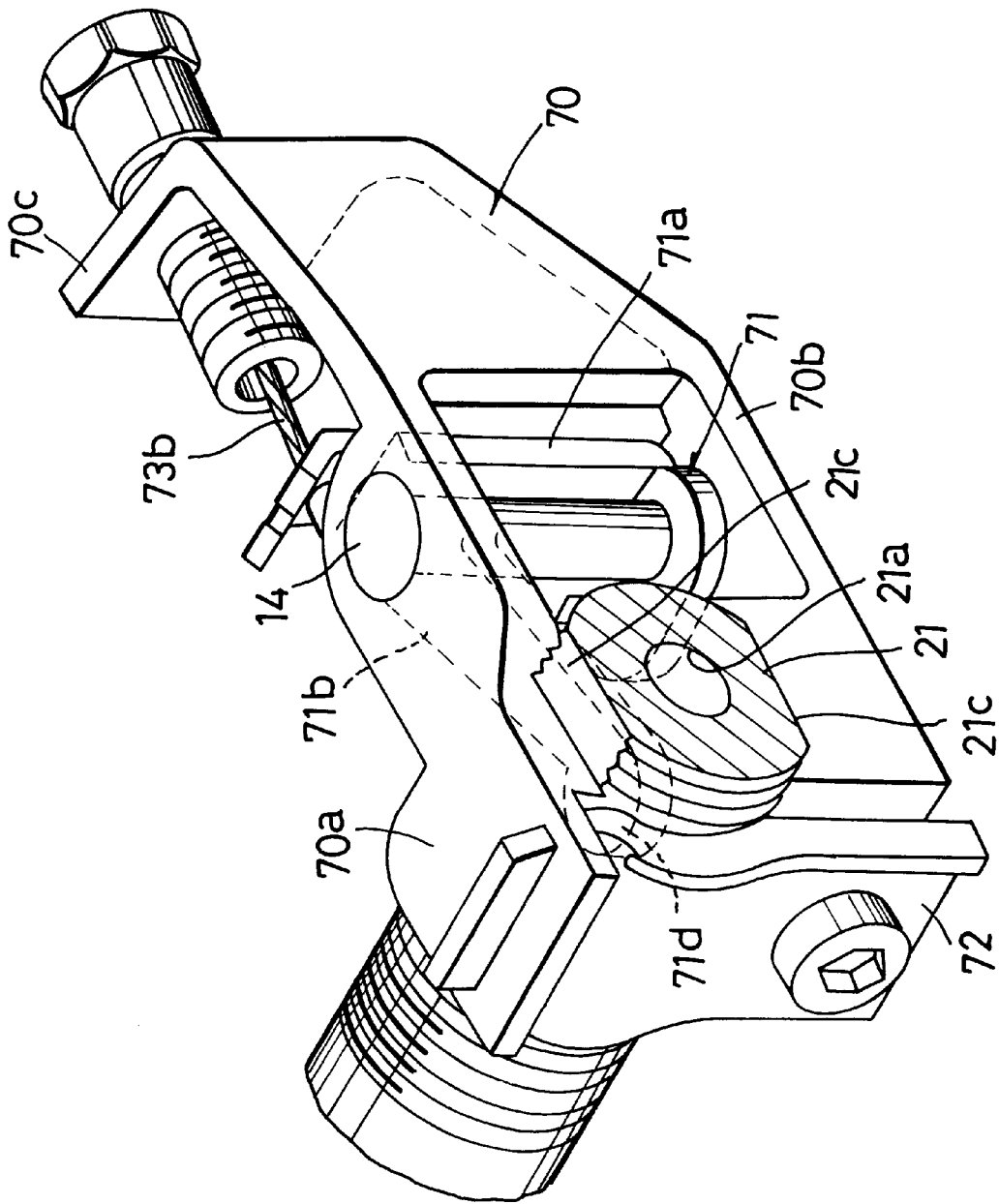
FIG. 7 is a detailed drawing of the bell crank actuating mechanism shown in FIG. 2.
Figure 8:
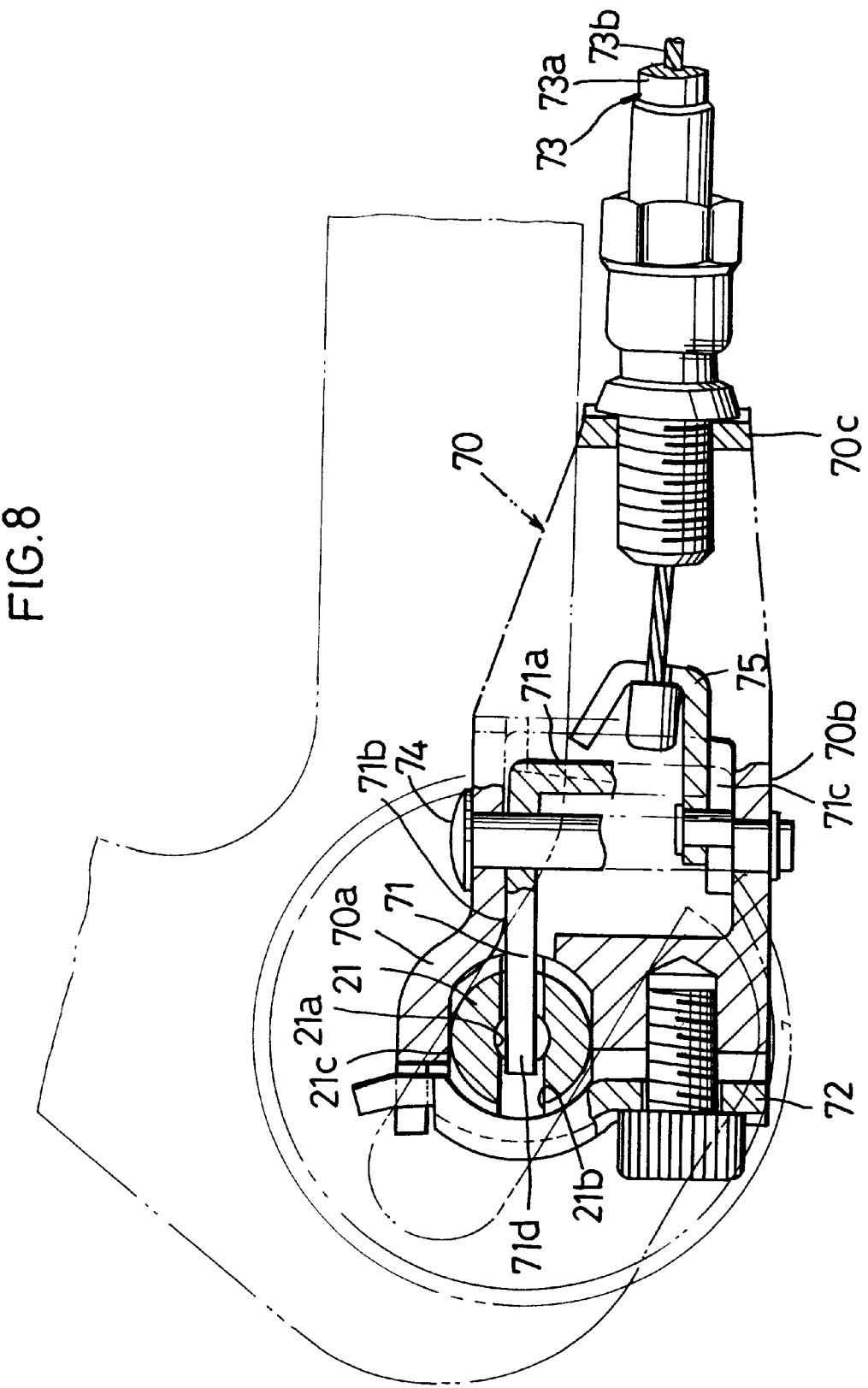
FIG. 8 is a partial cross sectional view of the bell crank actuating mechanism shown in FIG. 7.

The bell crank 26 is mounted to the inside of the rear dropout 2a in a state in which the hub axle 21 is mounted on the frame body 2, as shown in FIGS. 3, 7, and 8. The bell crank 26 comprises a support bracket 70 mounted at the chamfered components 21c and a link member 71 swingably supported by the support bracket 70. The support bracket 70 has a mounting component 70a that sandwiches the chamfered components 21c, a support component 70b that rotatably supports the link member 71 in the middle, and a stop component 70c that stops the outer casing 73a of the shift control cable 73 at the distal end.

The support bracket 70 is mounted on the hub axle 21 such that it cannot rotate and cannot move in the axial direction by sandwiching chamfered components 21c on the hub axle 21 with the mounting component 70a and a mounting band 72 stopped at one end to the mounting component 70a. A link shaft 74 for pivotably connecting the link member 71 is mounted on the support component 70b. An outer stop nut 76 that stops the outer casing 73a is threaded onto the stop component 70c, and this nut 76 allows the swing attitude of the link member 71 to be adjusted.

The link member 71 is a sheet-form member that has been folded into a cross sectional groove shape. Link member 71 has a bottom component 71a, an action arm 71b that extends from one end of the bottom component 71a to the hub axle 21 side, and an inner cable stop arm 71c that extends from the other end of the bottom component 71a to the inside of the hub axle 21 in the direction perpendicular to the action arm 71b. The link shaft 74 is disposed along this bottom component 71a, and the link shaft 74 is mounted to the support component 70b of the support bracket 70 through the base ends of the action arm 71b and the inner cable stop arm 71c. A circular strike component 71d is formed at the distal end of the action arm 71b, and the strike component 71d strikes the rear end of the push rod 48. A cable hanger 75 is rotatably mounted to the distal end of the stop arm 71c. The inner cable 73b of the shift control cable 73 is connected to this cable hanger 75. When the inner cable 73b is pulled by the shift control component 9, the link member 71 swings and a shift is performed.

As shown in FIG. 2, the coaster brake 27 is mounted to the clutch case 56. The coaster brake 27 comprises a brake roller 57 supported by the clutch case 56, a cam surface 41d formed around the outer periphery at the other end of the gear frame 41, and a brake shoe 58 that exerts a braking action on the inner surface at the other end of the hub shell 23. The brake roller 57 is designed such that it is pushed outward in the radial direction by the cam surface 41d when the driver 22 rotates in the reverse direction. As a result, the brake shoe 58 comes into contact with and brakes the inner surface of the hub shell 23.

Brake lock tends to occur when the coaster brake 27 is installed. Brake lock is a phenomenon whereby if the first one-way clutch 50 is in a power transmission state when the rider pedals backward to brake, the drive force will be transmitted in a state in which the brake is applied, and the brake cannot be released. A pawl cage 59 is mounted to the first one-way clutch 50 in this embodiment in order to prevent this phenomenon. The pawl cage 59 provides a specific angle of play between the ratchet teeth 23b of the hub shell 23 and the clutch pawl 53 of the first one-way clutch 50, and it allows the brake to be released while the ring gear 43 rotates by this amount of play. Specifically, the pawl cage 59 either prevents the clutch pawl 53 from being erected at a specific angle, or, even if it is erected, allows it to be erected at a position where it cannot stop the ratchet teeth 23b at the specific angle, and delays the time when the clutch pawl 53 is stopped by the ratchet teeth 23b during initial drive.

Because of the planet gear mechanism 24 and one-way clutches 50 to 52, this internal hub transmission 10 has:
  a downshift power transmission path made up of the driver 22, the ring gear 43, the planet gear mechanism 24, the gear frame 41, and the hub shell 23;
  a direct drive power transmission path made up of the driver 22, the ring gear 43, and the hub shell 23, and
  an upshift power transmission path made up of the driver 22, the clutch member 45, the gear frame 41, the planet gear mechanism 24, the ring gear 43, and the hub shell 23.

Shifting is performed by operating the push rod 48 with the bell crank 26 via the shift control cable 73. In the state shown in FIG. 3, in which the push rod 48 is not pushed in, the clutch member 45 is disposed in the downshift position at the right end, and the rotation from the driver 22 is transmitted to the hub shell 23 after being reduced in speed via the downshift power transmission path. More specifically, the rotation input to the driver 22 is transmitted to the ring gear 43 via the second one-way clutch 51. At this point, the clutch pawl 53 of the first one-way clutch 50 is rotated by the clutch member 45 to the retracted attitude shown by the two-dot chain line in FIG. 4, and the first one-way clutch 50 is in a power cutoff state. Accordingly, the rotation transmitted to the ring gear 43 is further transmitted to the hub shell 23 via the planet gear mechanism 24, the gear frame 41, and the third one-way clutch 52. In this case, the input rotation is reduced in speed according to the gear shift ratio determined by the numbers of teeth of the sun gear 40, the planet gears 42, and the ring gear 43.

Figure 9:
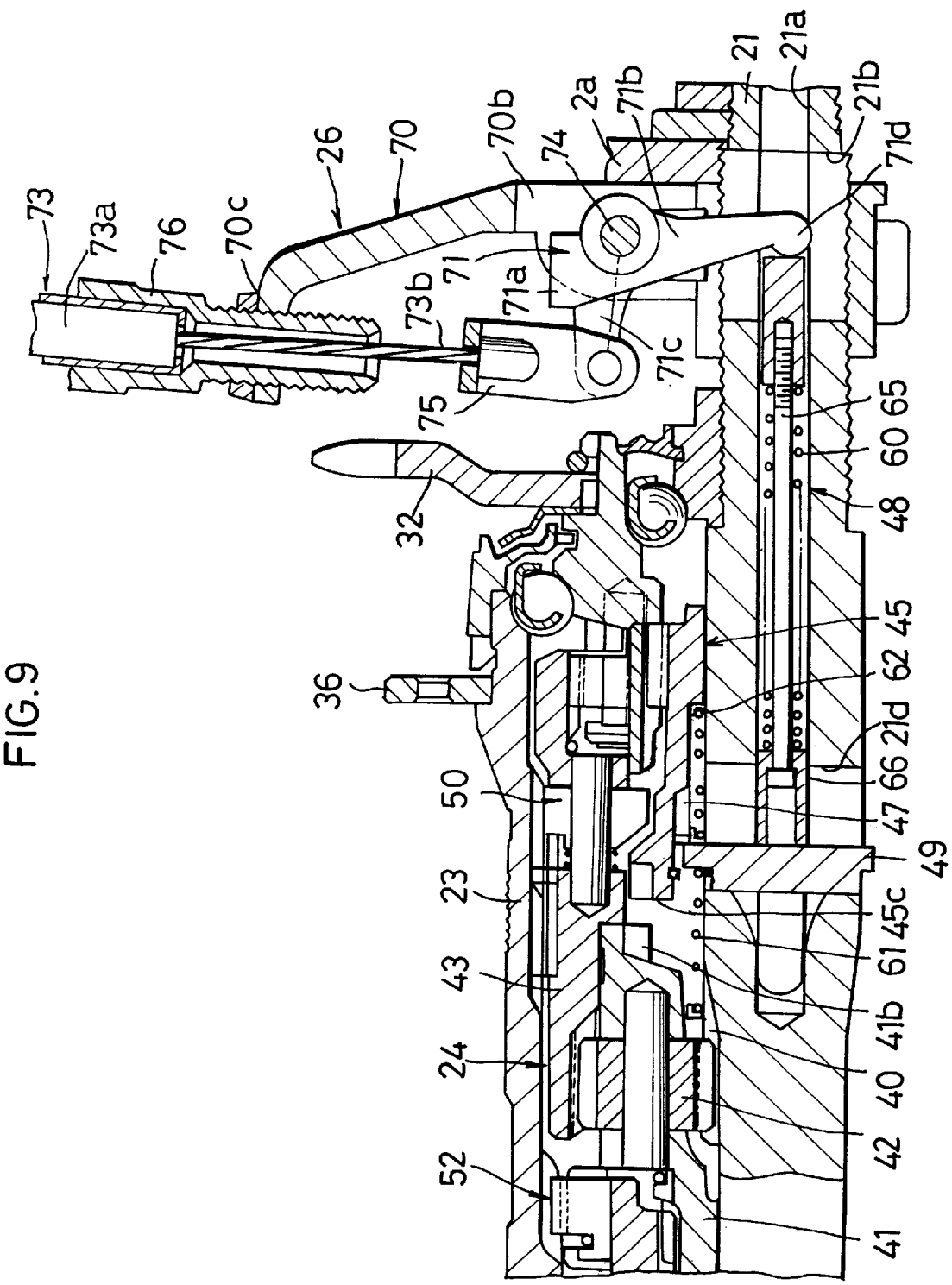
FIG. 9 is a cross sectional view of the internal hub transmission of FIG. 2 in a direct drive position.

If the winding lever of the shift control component 9 is operated, the link member 71 of the bell crank 26 swings and pushes in the push rod 48 by one stage. As a result, since the spring force of the first coil spring 60 is greater than the spring force of the second coil spring 61, the shift key 49 is pushed by the link member 71 via the push rod 48, guided into the second through-groove 21d, and moved to the left in FIG. 3 while rotating around the hub axle. The clutch member 45 is also pushed via the stop ring 63 and assumes the direct drive position. Once the clutch member 45 is disposed in the direct drive position shown in FIG. 9, the clutch pawl 53 of the first one-way clutch 50, which had been put into a retracted attitude by the taper surface 45d, is returned to the erected attitude shown by the solid line in FIG. 4 by the spring force of the torsion coil spring 55. In this state, the first one-way clutch 50 is able to transmit rotation only in the forward direction from the ring gear 43 to the hub shell 23. Therefore, the rotation from the driver 22 is directly transmitted to the hub shell 23 through the direct drive power transmission path. More specifically, the rotation input to the driver 22 is transmitted to the ring gear 43 via the second one-way clutch 51, then is transmitted to the hub shell 23 via the first one-way clutch 50, and the rotation of the driver 22 is transmitted directly to the hub shell 23 via the ring gear 43. At this point, the rotation is transmitted from the ring gear 43 to the gear frame 41 via the planet gear mechanism 24, and the gear frame 41 rotates at reduced speed, but since the rotation of the hub shell 23 is faster than that of the gear frame 41, there is no transmission of the rotation from the gear frame 41 to the hub shell 23 via the third one-way clutch 52.

When the winding lever is operated from the direct drive state and the push rod 48 is pushed in further, the shift key 49 moves further to the left, and the clutch member 45 also moves correspondingly to the upshift position. When the clutch member 45 is disposed in the upshift position shown in FIG. 10, the serration outer teeth 45c of the clutch member 45 and the serration inner teeth 41b of the gear frame 41 mesh with each other. In this movement to the upshift position, when the serration outer teeth 45c and the serration inner teeth 41b are disposed in the positions where they mesh, the clutch member 45 moves directly to the upshift position to the left after the clutch member 45 strikes the gear frame 41. When, however, these teeth are disposed in positions where they do not mesh, the shift key 49 and the clutch member 45 temporarily halt their movement to the left at the point when the clutch member 45 strikes the gear frame 41. When this happens, the actuator 66 of the push rod 48 retracts, the first coil spring 60 is compressed, and the shift key 49 is pressed. When the clutch member 45 then rotates and the two sets of teeth 45c and 41b reach their meshing positions, the spring force of the first coil spring 60 moves the clutch member 45 via the shift key 49, and the two sets of teeth 45c and 41b mesh.

In this state, the rotation transmitted to the driver 22 is transmitted to the hub shell 23 via the upshift transmission path. More specifically, rotation is transmitted from the driver 22, through the clutch member 45 and to the gear frame 41. The rotation transmitted to the gear frame 41 is transmitted to the hub shell 23 via the planet gear mechanism 24, the ring gear 43, and the first one-way clutch 50. In this case, the input rotation is increased in speed and output according to the gear shift ratio determined by the numbers of teeth of the sun gear 40, the planet gears 42, and the ring gear 43. There is an attempt at this point to transmit the rotation from the driver 22 toward the ring gear 43 via the second one-way clutch 51, but since the rotation of the ring gear 43 is faster than that of the driver 22, no rotation is transmitted from the second one-way clutch 51.

Since rotation is transmitted directly between the driver 22 and the ring gear 43 during such a shift from the downshift side to the upshift side, it is best to move the clutch member 45, which has no force acting upon it. Accordingly, the spring force of the first coil spring 60 for pushing the clutch member 45 may be reduced, and light shift operation can be achieved.

Figure 10:
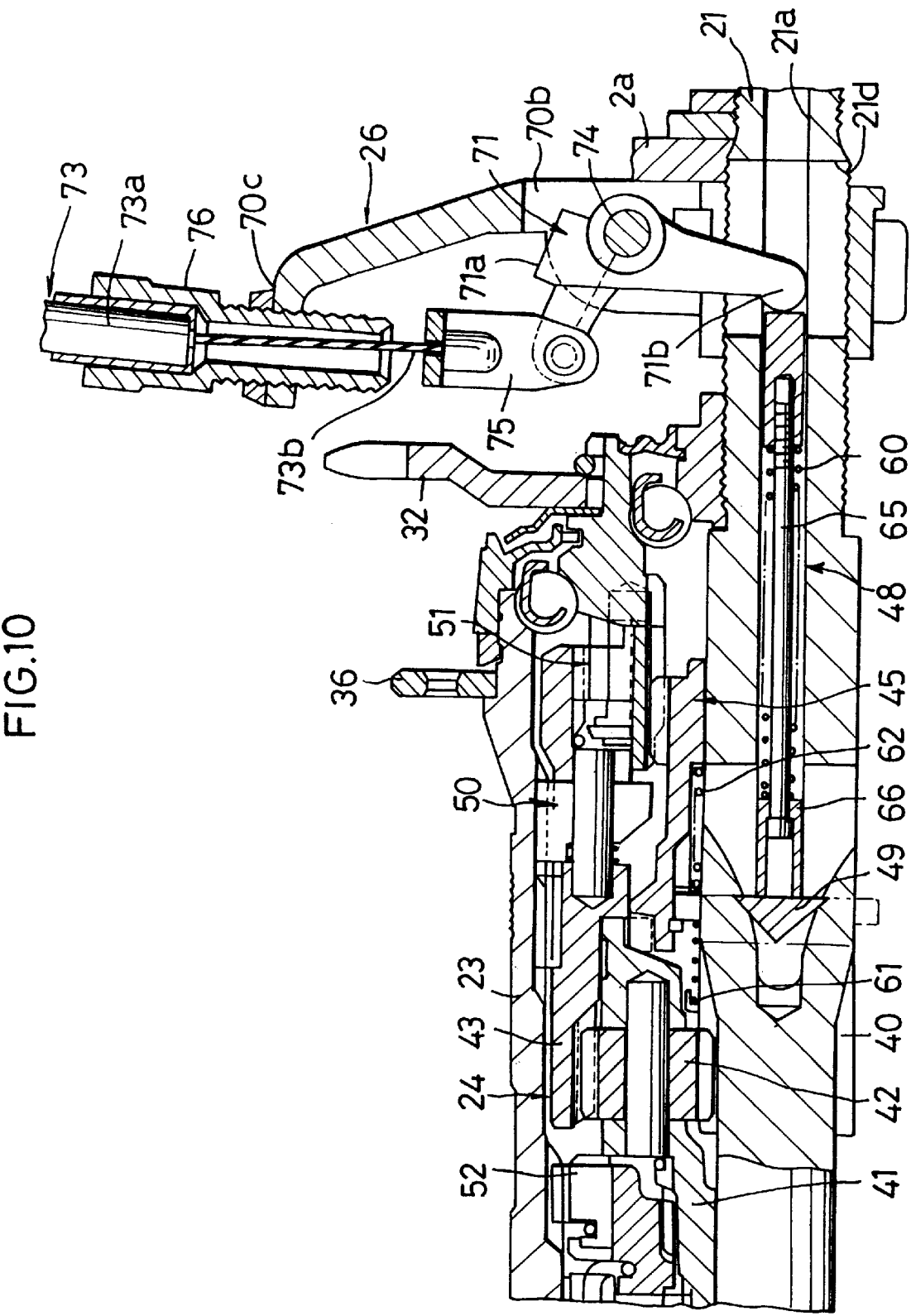
FIG. 10 is a cross sectional view of the internal hub transmission of FIG. 2 in a high speed drive position.

When the release lever of the shift control component 9 is operated at the upshift position shown in FIG. 10, the biasing force of the first coil spring 60 is removed, and the second coil spring 61 presses on the shift key 49 and causes the push rod 48 to retract by one stage to the right. The shift key 49 then presses on the clutch member 45 via the third coil spring 62 and attempts to move the clutch member 45 to the direct drive position. When the rider is not pedaling and no drive force is being transmitted, the clutch member 45 readily separates from the gear frame 41, and the clutch member 45 moves to the direct drive position. If the rider is pedaling, however, since drive force is being transmitted from the clutch member 45 to the gear frame 41, frictional force may cause the serration inner teeth 41b and the serration outer teeth 45b to remain meshed. In a case such as this, the spring force of the second coil spring 61 alone will not move the clutch member 45 to the right in FIG. 10. In a state such as this, when the shift key 49 strikes the flat surface 47a of the cam surface 47 of the clutch member 45 as shown in FIG. 5, the shift key 49 is pressed to the guide surface over the entire length of the portion inserted in the second through-groove 21d, and it is prevented by frictional force from escaping in the axial direction. As a result, when the shift key 49 rides up on the inclined surface 47c, the clutch member 45 moves to the right. When the serration inner teeth 41b and the serration outer teeth 45c are then unmeshed, the clutch member 45 is pressed by the second coil spring 61 via the shift key 49 and moves to the direct drive position. In other words, contact between the cam surface 47 of the clutch member 45 and the shift key 49 assists shifting by converting the rotational motion of the clutch member 45 into displacement in the axial direction.

The shift key 49 cannot readily escape to the left in the axial direction as mentioned above because it is pressed by the second coil spring 61, and the second through-groove 21d is inclined and twisted in a spiral with respect to the axis. Therefore, the shift key 49 will not escape in the axial direction when the transmitted drive force is less than the biasing force of the second coil spring 61 and the frictional force between the shift key 49 and the guide surface. However, when a drive force greater than these is applied, the shift key 49 may overcome the biasing force of the second coil spring 61 and the frictional force with the guide surface and escape to the left in the axial direction without the clutch member 45 moving. The frictional force here can be set by means of the groove inclination angle $\beta$. If this groove inclination angle $\beta$ is set too high, then it will be difficult for the shift key 49 to move to the left when the shift key 49 is pushed by the push rod 48. If the groove inclination angle $\beta$ is set too low, however, the resistance will be smaller during pushing by the push rod 48, but the frictional force will also decrease. Therefore, the groove inclination angle $\beta$ should be between 10 and 50 degrees. It is possible to adjust the drive force at the limit where the shift key 49 escapes during assist by adjusting this groove inclination angle $\beta$, the inclination angle $\alpha$ of the inclined surface 47c of the cam surface 47, and the spring force of the three coil springs 60 to 62.

Even when a drive force larger than the set drive force is applied and the shift key 49 escapes in the axial direction without the clutch member 45 moving, once the gear crank 18 reaches the vicinity of top dead center or bottom dead center and the drive force decreases, the clutch member 45 will be pressed by the assist force produced by the shift key 49 and will move to the right. Accordingly, a shift will not be performed when an extremely large drive force is applied, such as on a steep hill, which reduces shifting shock and helps prevent damage to the drive force transmission parts, such as the serration teeth and the one-way clutches. When the clutch member 45 finally moves, the shift key 49 is separated from the cam surface 47 by the third coil spring 62. Accordingly, there will be no noise generated by contact with the shift key 49 even if the clutch member 45 is rotated. In the direct drive position shown in FIG. 9, rotation is transmitted from the driver 22 to the hub shell 23 via the direct drive transmission path, as discussed above.

When the release lever is operated in a state in which the clutch member 45 is disposed in the direct drive position, the push rod 48 retracts further, and the shift key 49 presses on the clutch member 45. At this point the taper surface 45d of the clutch member 45 comes into contact with the clutch pawl 53 of the first one-way clutch 50 and attempts to lower the clutch pawl 53 from an erected attitude to a retracted attitude. However, because the clutch pawl 53 is transmitting power from the ring gear 43 to the hub shell 23, it is not readily lowered to a retracted attitude by the biasing force of the second coil spring 61 alone. Here again, when the shift key 49 strikes the cam surface 47 of the clutch member 45, an assist force is generated just as discussed above, the clutch member 45 is moved in the axial direction, and the clutch pawl 53 can be lowered.

Since rotation is transmitted directly to the ring gear 43, without going through the clutch member 45, there is a reduction in the operating force required during shifting in an upshift operation from the downshift side to the upshift side. Furthermore, since the rotational force of the clutch member 45 is assisted by being converted into displacement in the axial direction in a downshift operation from the upshift side to the downshift side, the rider can make a shift with a light force while still pedaling, even when upshifting.

Also, since the bell crank 26 is mounted to the inside of the hub axle end, the bell crank 26 does not protrude outward from the hub axle end, which prevents damage to the bell crank 26 and makes it less likely that objects will hit or snag on the bell crank 26.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. The structure of the bell crank 26 is not limited to that in the above embodiment, and many different variations are also possible. For example, the bell crank 26 is not limited to the mounting position given in the above embodiment, and when it is disposed in the upshift position when the inner cable has not been operated, the bell crank 26 should be mounted to the left in FIG. 2. The mechanism for transmitting rotation is not limited to a planet gear mechanism, and may instead be an outer tooth type of transmission mechanism, a belt, roller, or other type of transmission mechanism, or any of many other variations. Similarly, a variety of structures are possible for the planet gear mechanism. For instance, the planet gear mechanism may comprise two planet gear units set up next to each other on the right and left, and a one-way clutch may be disposed between these planet gear units.

Thus, the scope of the invention should not be limited by the specific structures disclosed. Instead, the true scope of the invention should be determined by the following claims.

What is claimed is:

1. An internal hub transmission for a bicycle comprising:

a hub axle having an axle axis and a dropout attachment location for retaining the transmission to a dropout of a bicycle frame;

a driver rotatably supported relative to the hub axle;

an output member rotatably supported relative to the hub axle;

a power transmission mechanism disposed between the driver and the output member for communicating rotational force of the driver to the output member through a plurality of transmission paths;

an operation mechanism disposed in the hub axle for movement in the direction of the axle axis to select among the plurality of transmission paths;

wherein the operation mechanism includes an elongated control rod having at least a portion that is completely surrounded by the hub axle;

wherein the control rod terminates at an end face before a free end of the hub axle;

an actuating mechanism mounted on the hub axle inboard of a free end of the hub axle between the dropout attachment location and the driver for moving the operation mechanism in the direction of the axle axis; and wherein the actuating mechanism extends through a radially outer surface of the hub axle at a location outside the output member and presses against the end face of the control rod in the direction of the axle axis.

2. The internal hub transmission according to claim 1 further comprising a biasing member for biasing the operation mechanism in one direction of the axle axis, and wherein the actuating mechanism moves the operation mechanism in an opposite direction of the axle axis.

3. The internal hub transmission according to claim 1 wherein the hub axle includes a groove for exposing the operation mechanism, and wherein the actuating mechanism extends into the groove.

4. The internal hub transmission according to claim 3 wherein the groove is disposed entirely inboard of the free end of the hub axle.

5. The internal hub transmission according to claim 1 wherein the actuating mechanism is swingably mounted to the hub axle.

6. The internal hub transmission according to claim 5 wherein the actuating mechanism comprises:

a support member mounted to the hub axle;

a link member swingably supported to the support member at an intermediate location of the link member.

7. The internal hub transmission according to claim 6 wherein the link member includes:

a first arm member extending from the intermediate portion for connecting to a control cable; and a second arm member extending from the intermediate portion for contacting the operation mechanism.

8. The internal hub transmission according to claim 7 further comprising a link shaft pivotably supporting the intermediate portion of the link member to the support member.

9. The internal hub transmission according to claim 6 wherein the support member includes a stop component for stopping an outer casing of a control cable.

10. The internal hub transmission according to claim 6 wherein the support member defines an opening for exposing the free end of the hub axle.

11. The internal hub transmission according to claim 10 wherein the hub axle extends through the support member.

12. The internal hub transmission according to claim 1 wherein the output member comprises a hub shell with a flange for supporting a plurality of spokes.

13. An internal hub transmission for a bicycle comprising:

a hub axle having an axle axis for retaining the transmission to a bicycle frame;

a driver rotatably supported relative to the hub axle;

an output member rotatable supported relative to the hub axle;

a power transmission mechanism disposed between the driver and the output member for communicating rotational force of the driver to the output member through a plurality of transmission paths;

an operation mechanism disposed in the hub axle for movement in the direction of the axle axis to select among the plurality of transmission paths;

wherein the operation mechanism includes an elongated control rod having at least a portion that is completely surrounded by the hub axle;

wherein the control rod terminates at an end face before a free end of the hub axle;

an actuating mechanism swingably mounted on the hub axle inboard of a free end of the hub axle for moving the operation mechanism in the direction of the axle axis;

wherein the actuating mechanism extends through a radially outer surface of the hub axle at a location outside the output member and presses against the end face of the control rod in the direction of the axle axis;

wherein the actuating mechanism comprises:
- a support member mounted to the hub axle; and
- a link member swingably supported to the support member at an intermediate location of the link member;

wherein the hub axle includes a groove for exposing the operation mechanism, and wherein the link member extends into the groove.

14. The internal hub transmission according to claim 13 wherein the groove is disposed entirely inboard of the free end of the hub axle.

15. The internal hub transmission according to claim 13 wherein the link member includes:
- a first arm member extending from the intermediate portion for connecting to a control cable; and
- a second arm member extending from the intermediate portion for contacting the operation mechanism.

16. The internal hub transmission according to claim 15 further comprising a link shaft pivotably supporting the intermediate portion of the link member to the support member.

17. The internal hub transmission according to claim 16 wherein the support member defines an opening for exposing the free end of the hub axle.

18. The internal hub transmission according to claim 17 wherein the hub axle extends through the support member.

19. The internal hub transmission according to claim 18 further comprising a biasing member for biasing the operation mechanism in one direction of the axle axis, and wherein the second arm member moves the operation mechanism in an opposite direction of the axle axis.

20. The internal hub transmission according to claim 19 further comprising a shift key that slides within a second groove formed in the hub axle in response to movement of the control rod in the direction of the axle axis.

21. An internal hub transmission assembly for a bicycle comprising:
- a rear dropout of a bicycle frame;
- a hub axle retained to the rear dropout and having an axle axis;
- a driver rotatably supported relative to the hub axle;
- an output member rotatably supported relative to the hub axle;
- a power transmission mechanism disposed between the driver and the output member for communicating rotational force of the driver to the output member through a plurality of transmission paths;
- an operation mechanism disposed in the hub axle for movement in the direction of the axle axis to select among the plurality of transmission paths; and
- an actuating mechanism mounted on the hub axle inboard of a free end of the hub axle between the rear dropout and the driver, wherein the actuating mechanism moves in the direction of the axle axis for moving the operation mechanism in the direction of the axle axis.

* * * * *